United States Patent
Boertjes et al.

(10) Patent No.: US 7,957,641 B2
(45) Date of Patent: Jun. 7, 2011

(54) METHOD OF WDM CHANNEL TAGGING AND MONITORING, AND APPARATUS

(75) Inventors: David W. Boertjes, Nepean (CA); Kim B. Roberts, Nepean (CA)

(73) Assignee: Ciena Corporation, Linthicum, MD (US)

(*) Notice: Subject to any disclaimer, the term of this patent is extended or adjusted under 35 U.S.C. 154(b) by 2818 days.

(21) Appl. No.: 10/067,910

(22) Filed: Feb. 8, 2002

(65) Prior Publication Data

US 2004/0208534 A1    Oct. 21, 2004

(51) Int. Cl.
*H04B 10/08* (2006.01)
*H04B 17/00* (2006.01)
*H04B 10/06* (2006.01)

(52) U.S. Cl. ............................. 398/25; 398/208

(58) Field of Classification Search .................... 398/25, 398/32, 33
See application file for complete search history.

(56) References Cited

U.S. PATENT DOCUMENTS 5,513,029 A    4/1996    Roberts ..................... 359/177

OTHER PUBLICATIONS

K. Ho et al., "Method for Crosstalk Measurement and Reduction in Dense WDM Systems", Journal of Lightwave Technology, vol. 14, No. 6, Jun. 1996.*
S. Seynejad et al., "Estimation of the SRS Crosstalk on Pilot-Tones in WDM Systems Using a Dither Transfer Matrix", OFC 2001, Mar. 17-22, 2001.*
Ramaswami, "Optical Networks: a Practical Perspective", Academic Press, 1998, pp. 217-227.*
Richard Habel, Kim Roberts, Alan Solheim, and James Harley, "Optical Domain Performance Monitoring", Proc. OFC2000, vol. 2, pp. 174-175, 2000.
H. S. Chung, S.K. Shin, K.J. Park, H.G. Woo, and Y.C. Chung, "Effects of Stimulated Raman Scattering on Pilot-Tone-Based WDM Supervisory Technique", IEEE Photon. Technol. Lett., vol. 12, No. 6, pp. 731-733, Jun. 2000.
Saeid Seydnejad, James Harley, and Frederic Simard, "Estimation of the SRS crosstalk on pilot-tones in WDM systems using a dither transfer matrix", Proc. OFC2001, vol. 3, pp. WDD37-1-WDD37-4, Mar. 2001.
S. Seydnejad, F. Simard, J. Harley, "Higher Order Effects in SRS Pilot-Tones Interaction", Optical Amplifiers and Their Applications Conference (OAA2001), Stress, Italy, Jul. 2001, Optical Society of America (OSA), OtuE17-1 to OtuE17-3.

* cited by examiner

*Primary Examiner* — Shi K Li
(74) *Attorney, Agent, or Firm* — Kent Daniels; Blake, Cassels & Graydon LLP

(57) ABSTRACT

Provided is an optical apparatus and method wherein power transfer coefficients arising from SRS are measured at a designated co-location point and the power of dithers, which are impressed on the channels of a multiplexed optical signal propagating through the optical apparatus, is measured at each co-location point. Within the optical apparatus distances between co-location points are short and the power transfer coefficients are effectively constant. Consequently, the power of each channel of the multiplexed optical signal at the co-location points is obtained from the power of the dithers at a respective one of the co-location points and the power transfer coefficients measured at the designated co-location point. In some embodiments, information on the channel power at the co-location points is used to provide instructions for compensating for fluctuations in channel power and/or channel count at an input and/or channel count within the optical apparatus.

10 Claims, 9 Drawing Sheets

METHOD OF WDM CHANNEL TAGGING AND MONITORING, AND APPARATUS

FIELD OF THE INVENTION

The invention relates to the field of optical networks. More specifically the invention pertains to wavelength division multiplexed systems.

BACKGROUND OF THE INVENTION

Performance monitoring to determine channel presence and per-channel power has been employed using detection of an entire spectrum of channels of an optical signal wherein each channel has had impressed upon it a known dither. The dither can be implemented in many ways, such as amplitude modulation (AM) of a tone or set of tones or a code division multiple access (CDMA) modulation scheme, etc.

In an example using AM detection each channel of a multiplexed optical signal has impressed upon it a unique AM tone and power of each channel of the optical signal is measured through differentiation of the unique AM tones and knowledge of a fixed modulation depth and total optical power. This technique has the benefit of being easy to implement and requires a broadband optical tap and a PIN detector to perform the monitoring function. In addition, one can uniquely identify the source of an optical signal by modulating AMs with wave identification (WID) information. The accuracy of this method in estimating per channel power is limited by effects such as stimulated Raman scattering (SRS) which limits its usage to systems with a small number of spans, small channel counts and low per channel powers.

Modern systems are striving to achieve greater span, higher channel count and require higher channel power, thus limiting the applicability of this approach. Another method is to use an optical spectrum analyzer (OSA) at each monitoring point or a single OSA with an optical switch for all points that are co-located (along the path of the optical signal). This approach provides accurate per-channel power measurements that are not affected by SRS. However, in the past, OSAs have not been equipped with the capability of discerning WID information. In addition, it is usually much more expensive to implement, slower in taking measurements and the optical switch can limit the overall reliability of the OSA function. Furthermore, an OSA takes up more space than a PIN detector and measurements at a plurality of co-location points using one or more OSAs causes fiber routing and handling issues.

Finally, SRS can affect system performance. Consequently, a measurement of the SRS present in a system is therefore needed so that it can be used to control the system to minimize the impact of the SRS.

SUMMARY OF THE INVENTION

The invention is an optical apparatus and method of wavelength division multiplexed (WDM) channel tagging and monitoring. The optical apparatus measures power transfer coefficients arising from a non-linear process in the transmission medium, such as SRS. These power transfer coefficients are effectively a measurement of the non-linear processes and may be used in the control and optimization of the transmission system.

The optical apparatus also measures inverse power transfer coefficients at a designated one or more of a plurality of co-location points. The cumulative power of dithers, which are impressed on channels of a multiplexed also be measured at additional co-location points. The invention takes advantage of the fact that within the optical apparatus distances between co-location points are short and the inverse power transfer coefficients are effectively independent of co-location point. Consequently, channel power of each channel of the multiplexed optical signal at the co-location points is obtained from the cumulative power of the dithers at a respective one of the co-location points and from the inverse power transfer coefficients calculated from effective power measurements at the designated co-location point(s). In this way, a fast dither detection of the power of the dithers occurs independently at a plurality of co-location points while slower but accurate power measurements for the calculation of the power transfer coefficients need to be performed only at a single one of the co-location points. Consequently, the disclosed apparatus and method maintain a fast and accurate way of implementing WDM channel tagging and monitoring. In addition, since modulation detection is used at the co-location points wave identification (WID) information may be extracted, at the co-location points, from the channels of the multiplexed optical signal. In some embodiments, information on the channel power at the co-location points is used to provide instructions to basic functional components of the optical device for compensating for fluctuations in input channel power and channel power within the optical apparatus.

In accordance with a first broad aspect of the invention, provided is a method of monitoring cross-talk in a multiplexed optical signal having a plurality of channels upon at least one of which is impressed a unique dither. The monitoring is performed at one point while the dithers are impressed at another point. Channel power is determined for at least one channel of the multiplexed optical signal. For each channel in which the channel power has been determined, a fractional power of at least one dither present upon the channel is also determined. Furthermore, the power transfer coefficients are determined from the fractional power and the channel power of the channels whose channel power has been determined. In some embodiments a power transfer coefficient, $\beta_{ij}$, of the power transfer coefficients may be determined from a channel power, $P_j$, of a channel, j, of the channels of the multiplexed optical signal and from a fractional power, $\beta_{ij}P_j$, of a dither, i, of the dithers, upon the channel, j. The power transfer coefficient, $\beta_{ij}$, may then be calculated using $\beta_{ij}=(\beta_{ij}P_j)/P_j$. In addition, in some embodiments, a method of controlling output characteristics of the multiplexed optical signal may include the above method and also include providing instructions for controlling the power transfer coefficients.

In accordance with another embodiment of the invention, provided is a method of determining channel power of at least one of a plurality of channels of a multiplexed optical signal. One or more unique dithers are each impressed upon a respective channel of the plurality of channels. A fractional power of each one of the dithers present upon at least one of the plurality of channels is determined. Power transfer coefficients are then determined from the fractional power and from the channel power of the channels whose channel power has been determined. The power of the dithers is also determined at at least one other co-location point and then, for each one of the dithers, respective contributions to the channel power of at least one of the plurality of channels are summed wherein the respective contributions at the at least one other co-location point are obtained from the power transfer coefficients and the power of the dithers.

In accordance with another embodiment of the invention, provided is a method of WDM channel tagging and monitoring. The method is applied to a multiplexed optical signal having a plurality of channels. One or more unique dithers are each impressed upon a respective channel of the plurality of channels. The method includes determining, at a designated one of a plurality of co-location points, inverse power transfer coefficients, $\beta'_{ji}$, of a matrix $[\beta']$. The method then includes determining, at at least one other co-location point, a power, $AM_i$, of the unique dithers wherein the power, $AM_i$, forms components of a vector $[AM]$. The channel power, $P_j$, of at least one of the channels of the multiplexed optical signal at the other co-location points is then calculated using $[P]=[\beta'][AM]$ wherein $[P]$ is a vector with components corresponding to the channel power, $P_j$, at the other co-location points and wherein the components, $AM_i$, of the vector $[AM]$ are determined at the other co-location points.

The power, $AM_i$, of the unique dithers might also be determined at the designated co-location point. Furthermore, the inverse power transfer coefficients, $\beta'_{ji}$, may be determined by determining the channel power, $P_j$, at the designated co-location point. A fractional power, $\beta_{ij}P_j$, of a dither i of the unique dithers present upon a channel j of the multiplexed optical signal, wherein $\beta_{ij}$ corresponds to power transfer coefficients, might also be determined. The power transfer coefficients, $\beta_{ij}$, may then be calculated from information on the channel power, $P_j$, and the fractional power, $\beta_{ij}P_j$ and using $\beta_{ij}=(\beta_{ij}P_j)/P_j$. The inverse power transfer coefficients, $\beta'_{ji}$, might then be calculated through inversion of a matrix $[\beta]$, which may have as matrix elements the power transfer coefficients, $\beta_{ij}$, to obtain the inverse matrix $[\beta']$. The sub-scripts of the inverse power transfer coefficients, $\beta'_{ji}$, may have been reversed with respect to the power transfer coefficients, $\beta_{ij}$, for notational convenience such that channel powers always use the sub-script j and dither powers always use the sub-script i. The calculated channel power, $P_j$, and the inverse power transfer coefficients, $\beta'_{ji}$, might have complex values in which case channel power might be determined by taking an absolute value of the channel power, $P_j$.

The method might be applied to a multiplexed optical signal in which transfer of dithers from any one of its channels to any other one of its channels is due to stimulated Raman scattering (SRS). Furthermore, at least one the channels of the multiplexed optical signal might be impressed with a plurality of dithers to provide wave identification (WID) information.

The method may include controlling output characteristics of the multiplexed optical signal by perhaps providing instructions to at least one of a plurality of basic functional components in response to fluctuations in the channel power, $P_j$, and/or channel count of the optical signal at an input and/or the co-location points. Instructions might also be provided to at least one of the basic functional components in response to fluctuations in the power transfer coefficients, $\beta_{ij}$, of the matrix $[\beta]$ at one or more of the co-location points.

In accordance with another embodiment of the invention, provided is a method of wavelength division multiplexed (WDM) channel tagging and monitoring of a multiplexed optical signal. The multiplexed optical signal has a plurality of channels. One or more unique dithers are each impressed upon a respective channel of the plurality of channels. Values of inverse power transfer coefficients $\beta'_{ji}$, of a matrix $[\beta']$, at a designated one of a plurality of co-location points are determined. Furthermore, a portion of the multiplexed optical signal from at least one other co-location point is received and indicators of powers, $AM_i$, of the unique dithers are measured wherein the effective power measurements, $AM_i$, form components of a vector $[AM]$. The channel power, $P_j$, of at least one of the channels of the multiplexed optical signal at the at least one other co-location point is then calculated using $[P]=[\beta'][AM]$ wherein $[P]$ is a vector with components corresponding to the channel power, $P_j$, at the at least one other co-location point and wherein the components, $AM_i$, of the vector $[AM]$ are the powers of the unique dithers at the at least one other co-location point.

In accordance with another embodiment of the invention, provided is an optical apparatus which is used to monitor cross-talk in a multiplexed optical signal at a point in an optical system. The multiplexed optical signal has a plurality of channels upon at least one of which has been impressed, at another point in the optical system, a unique dither. The apparatus has an OSA (Optical Spectrum Analyzer) that is used to measure an indicator of channel power of at least one channel of the plurality of channels. For those channel whose indicator of channel power is determined the OSA also measures an indicator of fractional power of at least one of the dithers present upon the channels. The apparatus also has a control circuit used to determine power transfer coefficients from the fractional power and the channel power.

In accordance with another embodiment of the invention, provided is an optical apparatus which is applied to a multi-plexed optical signal having a plurality of channels. One or more unique dithers are each impressed upon a respective channel of the plurality of channels. The optical apparatus has an optical spectrum analyzer (OSA) adapted to receive a portion of the multiplexed optical signal from a designated co-location point of a plurality of co-location points. The optical apparatus also has at least one dither detector adapted to receive a portion of the multiplexed optical signal from a respective other one of the co-location points. The dither detectors are used to measure a power, $AM_i$, of the dithers. The optical apparatus also has a control circuit connected to the OSA and to the dither detectors. The control circuit is used to calculate inverse power transfer coefficients, $\beta'_{ji}$, calculated from information on the multiplexed optical signal, at the designated co-location point, obtained from the OSA. The control circuit is also used to calculate a channel power, $P_j$, of at least one of the channels of the plurality of channels at the respective other one of the co-location points based on information associated with the power, $AM_i$, of the dithers at the respective other one of the co-location points and based on the inverse power transfer coefficients, $\beta'_{ji}$.

The OSA might also be used to measure, from the portion of the optical signal received from the designated co-location point, an indicator of a fractional power, $\beta_{ij}P_j$, of a dither i of the unique dithers upon on a channel j of the plurality of channels. Furthermore, the OSA might be used to measure, from the portion of the optical signal received from the designated co-location point, an indicator of the channel power, $P_j$, of the plurality of channels.

The control circuit might be further used to provide instructions to at least one basic functional component for controlling characteristics of the multiplexed optical signal at an output in response to fluctuations in any one or more of the channel power, $P_j$, channel count of the multiplexed optical signal and changes in the inverse power transfer coefficients, $\beta'_{ji}$, at an input and/or the co-location points.

In accordance with another embodiment of the invention, provided is an optical apparatus which is applied to a multi-plexed optical signal having a plurality of channels. One or more unique dithers are each impressed upon a respective channel of the plurality of channels. The optical apparatus has an OSA connected at a designated co-location point of a plurality of co-location points. The optical apparatus also has at least one dither detector connected to a respective other one of the co-location points. The dither detectors are used to measure an indicator of a power, $AM_i$, of the dithers. The optical apparatus has a control circuit connected to the OSA and to the at least one dither detector. The control circuit is used to calculate inverse power transfer coefficients, $\beta'_{ji}$, calculated from information on the multiplexed optical signal, at the designated co-location point, obtained from the OSA. The control circuit also calculates a channel power, $P_j$, of at least one of the channels of the plurality of channels at the respective other one of the co-location points based on information associated with the power, $AM_i$, of the dithers at the respective other one of the co-location points and based on the inverse power transfer coefficients, $\beta'_{ji}$.

Such an apparatus might have a plurality of basic functional components that are any suitable optical devices.

According to yet another embodiment of the invention, provided is a computer readable storage medium carrying code. The code is used to determine, at a designated co-location point of a plurality of co-location points, values of inverse power transfer coefficients, $\beta'_{ji}$. The inverse power transfer coefficients, $\beta'_{ji}$, are associated with a channel power, $P_j$, of channels of a multiplexed optical signal having a plurality of channels. One or more unique dithers are each impressed upon a respective channel of the plurality of channels. In addition, received from one or more of the co-location points is information associated with a power, $AM_i$, of the dithers. The code is then used to calculate channel power, $P_j$, of the plurality of channels at the one or more of the co-location points using the information associated with the power, $AM_i$, of the unique dithers at a respective one of the co-location points and the inverse power transfer coefficients, $\beta'_{ji}$. The code may be used to calculate, at periodic time intervals, new values for the inverse power transfer coefficients, $\beta'_{ji}$.

The invention enables a well known and widely implemented dithered channel tagging and monitoring technique to be applied to WDM systems that would normally be hampered by SRS. The result is a simpler, faster, less expensive and more reliable monitoring system.

In addition, the invention enables the measurement of the SRS present in the system. Since SRS can affect system performance, information on the SRS can be used to control the system in such a way as to minimize the impact of the SRS.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
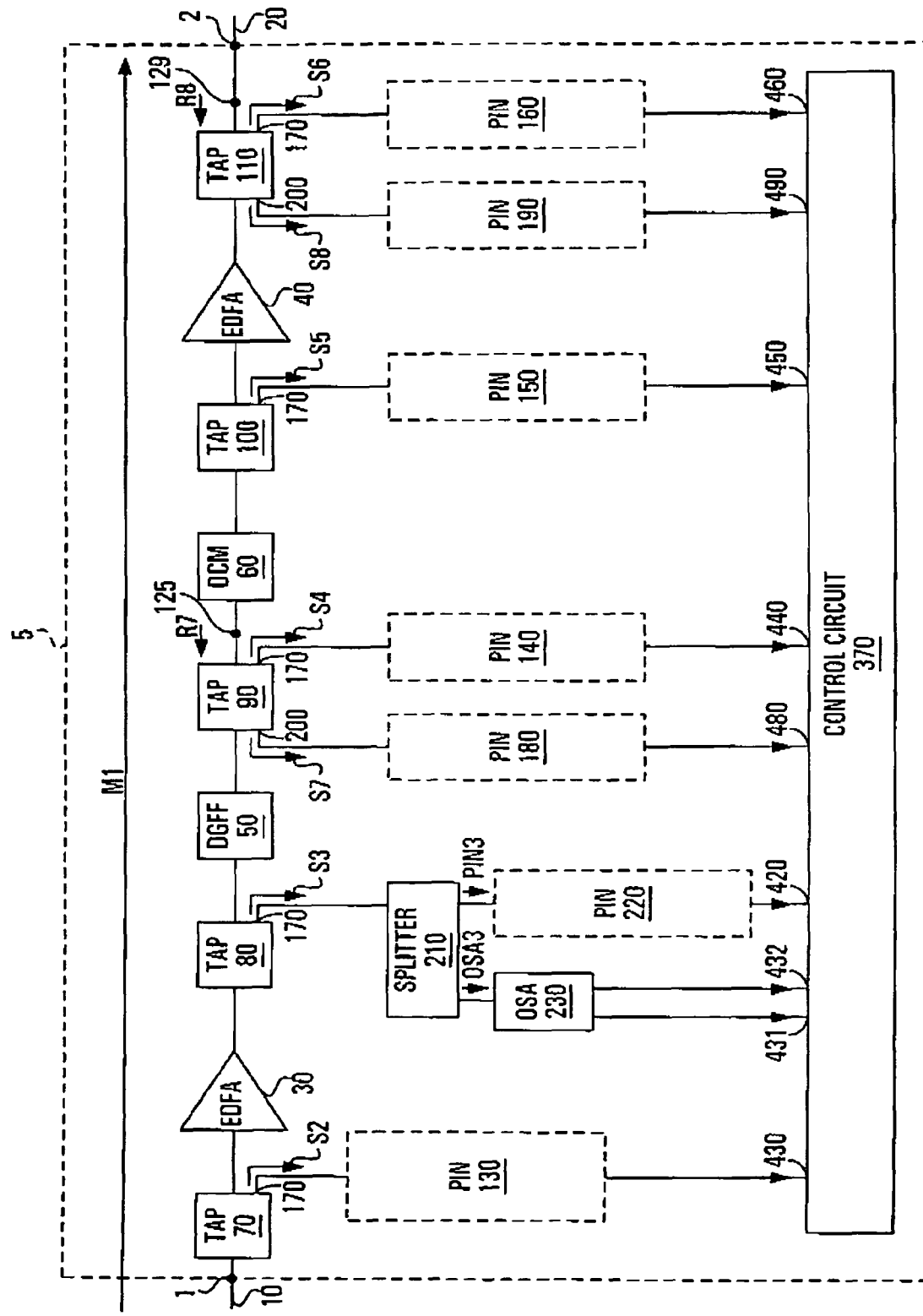
FIG. 1 is a schematic diagram of an optical line-amplifier implementing a method of wavelength division multiplexed (WDM) channel tagging and monitoring, in an embodiment of the invention.

In long haul optical networks the accuracy of amplitude modulation (AM) detection or other modulation schemes using wide-band detection of an entire spectrum of channels to determine channel presence and per-channel power is limited by effects of stimulated Raman scattering (SRS). In the modulation schemes at least one channel of a multiplexed optical signal is impressed with a unique dither. In an example, for a multiplexed optical signal having N channels (carriers) each having impressed upon it a unique AM tone (a unique dither) having a fixed modulation depth and a specific frequency, cross-talk mediated by SRS or other non-linear processes results in transfer of AM tones from one channel to another. Embodiments of the invention are not limited to having all channels of the multiplexed optical signal impressed with a unique dither. In embodiments of the invention at least one of the channels is impressed with a unique dither. In an optical transmission system the power, $AM_i$ (i=1 to N) of the AM tones of the multiplexed optical signal is given by the following matrix equation:

$$[AM] = [\beta][P] \quad (1)$$

where [AM] is a vector with components $AM_i$ (i=1 to N) corresponding to the power of the AM tones, [$\beta$] is an N×N matrix with power transfer coefficients, $\beta_{ij}$, (i, j=1 to N) and [P] is a vector with components $P_j$ (j=1 to N). The components $P_j$ correspond to the channel power of each channel of the multiplexed optical signal. When there is no cross-talk of the AM tones from one channel to another, the matrix [$\beta$] has null non-diagonal elements (i.e. $\beta_{ij}=0$ when i≠j). Alternatively, for example, in the case of cross-talk mediated by SRS the matrix [$\beta$] has non-zero non-diagonal elements and the power transfer coefficients, $\beta_{ij}$, depend on the distance over which the multiplexed optical signal has traveled, channel power, channel count and the physical properties of the medium that gives rise to SRS.

From equation (1), the channel power of each channel is given by $$[P] = [\beta]^{-1}[AM] = [\beta'][AM] \quad (2)$$

where [$\beta'$] is the inverse matrix of [$\beta$], with inverse power transfer coefficients, $\beta'_{ji}$. Therefore, in optical systems having SRS mediated cross-talk the inverse power transfer coefficients, $\beta'_{ji}$, and the power, $AM_i$, of the AM tones are required to calculate the channel power, $P_j$, of each channel of the multiplexed optical signal. In an optical device, it is sometimes useful to monitor the channel power at different co-location points along the path of the multiplexed optical signal as it propagates through different functional components of the optical device. In principle the inverse power transfer coefficients, $\beta'_{ji}$, and the power, $AM_i$, of the AM tones must be measured at each co-location point to determine the channel power, $P_j$, of each channel of the multiplexed optical signal. However, significant changes in the inverse power transfer coefficients, $\beta'_{ji}$, occur only over long distances, of the order of 100 km, as the multiplexed optical signal propagates through an optical fiber or wave-guide. Within an optical device the distances between co-location points are relatively small and the inverse power transfer coefficients, $\beta'_{ji}$, are effectively independent of co-location point. Consequently, while the power, $AM_i$, of the AM tones is measured at every co-location point, a measurement of the inverse power transfer coefficients, $\beta'_{ji}$, need only be performed at one of the co-location points to determine the channel power, $P_j$, of the channels of the multiplexed optical signal at respective one of the co-location points.

Referring to FIG. 1, shown is a schematic diagram of an optical line-amplifier 5 implementing a wavelength division multiplexed (WDM) channel tagging and monitoring technique, in an embodiment of the invention. The optical line-amplifier 5 is formed of a series of basic functional components comprising input and output erbium-doped fiber amplifiers (EDFAs) 30,40, respectively, a dynamic gain flattened filter DGFF 50 and a dispersion compensation module (DCM) 60 connected in series. In other embodiments of the invention, the input and output EDFAs 30,40, respectively, are any suitable gain blocks capable of amplifying an optical signal. A broadband optical tap is inserted between any two functional components of the optical line-amplifier 5 that are connected together. In particular, broadband optical taps 70,80,90,100,110 are connected at locations between an input optical fiber 10 and the input EDFA 30 at an input 1, between the input EDFA 30 and the DGFF 50, between the DGFF 50 and the DCM 60, between the DCM 60 and the output EDFA 40 and between the output EDFA 40 and an output optical fiber 20 at an output 2, respectively. Preferably, the broadband optical taps 70,80,90,100,110 are asymmetric broadband optical taps and locations of the broadband optical taps 70,80,90,100,110 are referred to as co-location points. PIN detectors 130,140,150,160,180,190,220 are connected to a control circuit 370 through inputs 430,440,450,460,480,490,420, respectively. In other embodiments of the invention, the PIN detectors 130,140,150,160,180,190,220 are any suitable dither detectors capable of detecting dithers. One OSA 230 is connected to the control circuit 370 through two inputs 431, 432. The control circuit 370 carries out calculations as described herein below and is preferably implemented as software running on a microprocessor. Alternatively, the software may be impressed as hardware into the microprocessor.

Connections throughout the optical line-amplifier 5 are achieved through a plurality of optical connectors (only two optical connectors 125,129 are shown). The PIN detectors 130,140,150,160 are connected to outputs 170 of the broadband optical taps 70,90,100,110, respectively. PIN detectors 180,190 are connected to outputs 200 of the broadband optical taps 90,110, respectively.

An optical splitter 210 is connected to output 170 of the broadband optical tap 80. The optical splitter 210 has two outputs and is preferably a 1×2 3-dB optical coupler. A PIN detector 220 is connected to one of the outputs of the optical splitter 210 and an optical spectrum analyzer (OSA) 230 is connected to the other output of the optical splitter 210. In the preferred embodiment of FIG. 1 the OSA 230 is connected to the broadband optical tap 80 through the optical splitter 210. In other embodiments of the invention, the OSA 230 may be connected through to any one of the broadband optical taps 70,90,100,110.

A multiplexed optical signal M1 carrying N channels propagates along the input optical fiber 10. Each channel of the multiplexed optical signal M1 is amplitude modulated with a dither having a fixed modulation depth and a unique frequency which is much smaller than the carrier frequency (which happens to be the channel frequency). Each channel of the multiplexed optical signal M1 is therefore amplitude modulated with its unique AM tone. Preferably, the modulation depth lies in the range 0.02 to 0.05. In other embodiments of the invention, each channel of the multiplexed optical signal M1 may be amplitude modulated with one or more additional dither(s) resulting in a plurality of AM tones impressed upon each channel. In such embodiments, the one or more additional dither(s) are used to carry wave identification (WID) information of a respective one of the channels.

As described above, in one embodiment of the invention, the dithers are implemented using an amplitude modulation scheme. Embodiments of the invention are not limited to an amplitude modulation scheme and other suitable modulation schemes such us a code division multiple access (CDMA) modulation scheme are used in other embodiments of the invention. In any one of the modulation schemes each channel of the multiplexed optical signal is modulated with one or more unique dither(s) and $AM_i$ generally refers to the power of a dither i.

The multiplexed optical signal M1 propagates into the broadband optical tap 70 where it is split. A significant portion of the multiplexed optical signal M1 propagates to the EDFA 30 and a multiplexed optical signal S2 that carries a small portion, preferably approximately 2%, of the multiplexed optical signal M1 propagates to the PIN detector 130. The multiplexed optical signal M1 is amplified by the EDFA 30 and propagates into the broadband optical tap 80 where it is split. A significant portion of the multiplexed optical signal M1 continues to propagate to the DGFF 50 and a multiplexed optical signal S3 carries a small portion, preferably approximately 5%, of the multiplexed optical signal M1 to the optical splitter 210. The DGFF 50 performs gain equalization over the multiplexed optical signal M1. The multiplexed optical signal M1 then propagates into the broadband optical tap 90 where it is split. A significant portion of the multiplexed optical signal M1 propagates to the DCM 60 and a multiplexed optical signal S4 carries a small portion, preferably approximately 2%, of the multiplexed optical signal M1 to the PIN detector 140. The DCM 60 performs dispersion compensation over the multiplexed optical signal M1. The multiplexed optical signal M1 then propagates into the broadband optical tap 100 where it is split. A significant portion of the multiplexed optical signal M1 propagates to the EDFA 40 and a multiplexed optical signal S5 carries a small portion, preferably approximately 2%, of the multiplexed optical signal M1 to the PIN detector 150. The EDFA 40 amplifies the multiplexed optical signal M1 and the multiplexed optical signal M1 then propagates into the broadband optical tap 110 where it is split. A significant portion of the multiplexed optical signal M1 propagates to the output optical fiber 20 and a multiplexed optical signal S6 carries a small portion, preferably approximately 2%, of the multiplexed optical signal M1 to the PIN detector 160.

Reflections of the multiplexed optical signal M1 may occur at any one of the optical connectors, including optical connectors 125,129. Reflections of the multiplexed optical signal M1 at the optical connector 125 propagate as a reflected multiplexed optical signal R7 to the broadband optical tap 90. A portion of the reflected multiplexed optical signal R7 is output at the output 200 of the broadband optical tap 90 as a multiplexed optical signal S7 that propagates to the PIN detector 180 and a remaining portion of the reflected multiplexed optical signal R7 propagates to the DGFF 50. Similarly, reflections of the multiplexed optical signal M1 at the optical connector 129 propagate as a reflected multiplexed optical signal R8 to the broadband optical tap 110. A portion of the reflected multiplexed optical signal R8 is output at the output 200 of the broadband optical tap 110 as an optical signal S8 that propagates to the PIN detector 190 and a remaining portion of the reflected multiplexed optical signal R7 propagates to the output EDFA 40.

At the optical splitter 210, the multiplexed optical signal S3 is split into a multiplexed optical signal OSA3 that propagates to the OSA 230 and split into a multiplexed optical signal PIN3 that propagates to the PIN detector 220. For each channel of the multiplexed optical signal OSA3 the OSA 230 measures an indicator of the channel power. $P_j$, (j=1 to N where N is the number of channels) of the multiplexed optical signal M1. The OSA 230 also measures an indicator of a fractional power, $\beta_{ij}P_j$, of AM tone i present upon channel j of the multiplexed optical signal M1 (the power, $\beta_{ij}P_j$, is a fraction of the power, $AM_i$). In the preferred embodiment of FIG. 1 the indicators are voltages and the OSA 230 converts the voltages to powers. This is discussed in more detail below with reference to FIGS. 4A, 4B and 5.

Information associated with the powers $P_j$ and $\beta_{ij}P_j$ is sent to the control circuit 370 through inputs 432 and 431, respectively. The control circuit 370 then calculates the power transfer coefficients, $\beta_{ij}$, using $$\beta_{ij} = \frac{\beta_{ij}P_j}{P_j}. \quad (3)$$

Given the matrix elements, $\beta_{ij}$, the control circuit 370 then calculates the inverse power transfer coefficients, $\beta'_{ji}$, of the matrix $[\beta']$ by inverting the matrix $[\beta]$.

The PIN detectors 130,140,150,160,220 are used to measure an indicator of the power, $AM_i$, of AM tones of the multiplexed optical signal M1 at the broadband optical taps 70,90,100,110,80 respectively. Similarly, the PIN detectors 180,190 are used to measure the indicator the power, $AM_i$, of AM tones of respective ones of the reflected multiplexed optical signals R7,R8 at the broadband optical taps 90,110, respectively. In the preferred embodiments of FIG. 1 the indicator of the power, $AM_i$, is a voltage and voltages are converted to powers by the PIN detectors 130,140,150,160, 180,190,220. An illustrative example of measurements of the indicator of the power, $AM_i$, is discussed below with respect to FIG. 3.

Information associated with the power, $AM_i$, of AM tones of the multiplexed optical signal M1 at the broadband optical taps 70,80,90,100,110 is sent to the control circuit 370 from a respective one of the PIN detectors 130,220,140,150, 160 through a respective one of the inputs 430,420,440,450,460. Similarly, information on the power, $AM_i$, of AM tones of the reflected multiplexed optical signals R7,R8 at the broadband optical taps 90,110, respectively is then sent to the control circuit 370 from a respective one of the PIN detectors 180,190 through a respective one of the inputs 480,490.

The control circuit 370 receives, at inputs 430,420,440, 450,460, information associated with the power, $AM_i$, of AM tones of the multiplexed optical signal M1 at co-location points corresponding to the broadband optical taps 70,80,90, 100,110, respectively. The control circuit 370 also receives, at inputs 480,490, information on the power, $AM_i$, of AM tones of respective reflected multiplexed optical signals R7,R8 at co-location points corresponding to the broadband optical taps 90,110, respectively. Since the co-location points (or equivalently, the broadband optical taps 70,80,90,100,110) are positioned over a short span, the inverse power transfer coefficients, $\beta'_{ji}$, do not change significantly from one co-location point to another. Consequently, the inverse power transfer coefficients, $\beta'_{ji}$, obtained from measurements using the OSA 230 and calculated for a designated co-location point corresponding to the broadband optical tap 80 also correspond to respective inverse power transfer coefficients at the co-location points corresponding to the broadband optical taps 70,90,100,110. Therefore, given the power, $AM_i$, of the AM tones at each co-location point the control circuit 370 calculates the channel power, $P_j$, of each channel of the multiplexed optical signal M1 at respective co-location points using equation (2) and from the inverse power transfer coefficients, $\beta'_{ji}$, obtained from measurements using the OSA 230. In this way, the channel power of each channel of the multiplexed optical signal M1 is measured at a plurality of co-location points along the optical line-amplifier 5 according measurements of the inverse power transfer coefficients, $\beta'_{ji}$, at a designated co-location point using a single OSA. Since measurements by the PIN detectors 130,140,150,160,180, 190,220 are more efficient (faster and more cost effective) than measurements by the OSA 230 it is preferable to make use of a single set of measurements by the OSA 230 to obtain the channel power at the co-location points.

As discussed herein above, PIN detector 220 measures an indicator of the power, $AM_i$, of the AM tones for calculation of the channel power, $P_j$, of each channel of the multiplexed optical signal M1 at the broadband optical tap 80. However, the OSA 230 also measures an indicator of the channel power, $P_j$, of each channel of the multiplexed optical signal M1 at the broadband optical tap 80. As such, the PIN detector 220 provides validation measurements by comparing results obtained from a PIN detector and an OSA at a common co-location point.

Fluctuations in channel power and channel count of the multiplexed optical signal M1, prior to reaching input 1 of the optical line-amplifier 5, can occur causing fluctuations in the inverse power transfer coefficients, $\beta'_{ji}$. The OSA 230 and control circuit 370 therefore perform re-calibration of the inverse power transfer coefficients, $\beta'_{ji}$, at periodic time intervals. In the preferred embodiment of FIG. 1, the inverse power transfer coefficients, $\beta'_{ji}$, are measured approximately every hour to compensate for the fluctuations. In other embodiments of the invention, the inverse power transfer coefficients, $\beta'_{ji}$, are re-calibrated at time intervals in accordance with a period of fluctuation of the channel power and channel count of the multiplexed optical signal M1.

In other embodiments of the invention, an apparatus in which the method of channel tagging and monitoring is applied need not be an optical line-amplifier. It may instead be any suitable optical apparatus in which monitoring of channel power of channels of a multiplexed optical signal propagating through the optical apparatus is required at a plurality of co-location points within the apparatus. In such an embodiment, the inverse power transfer coefficients, $\beta'_{ji}$, are calculated from measurements of the channel power, $P_j$, and the fractional power, $\beta_{ij}P_j$, at a designated co-location point which is located along a path defined by a series connection of basic functional components of the optical apparatus. In such an embodiment, measurement of the power, $AM_i$, of AM tones of a multiplexed optical signal and/or reflected portion of it is performed at one or more of the co-location points other than the designated co-location point. In addition, in some embodiments, measurement of the power, $AM_i$, of AM tones of a multiplexed optical signal and/or reflected portion of it is also performed at the designated co-location point.

Figure 2A:
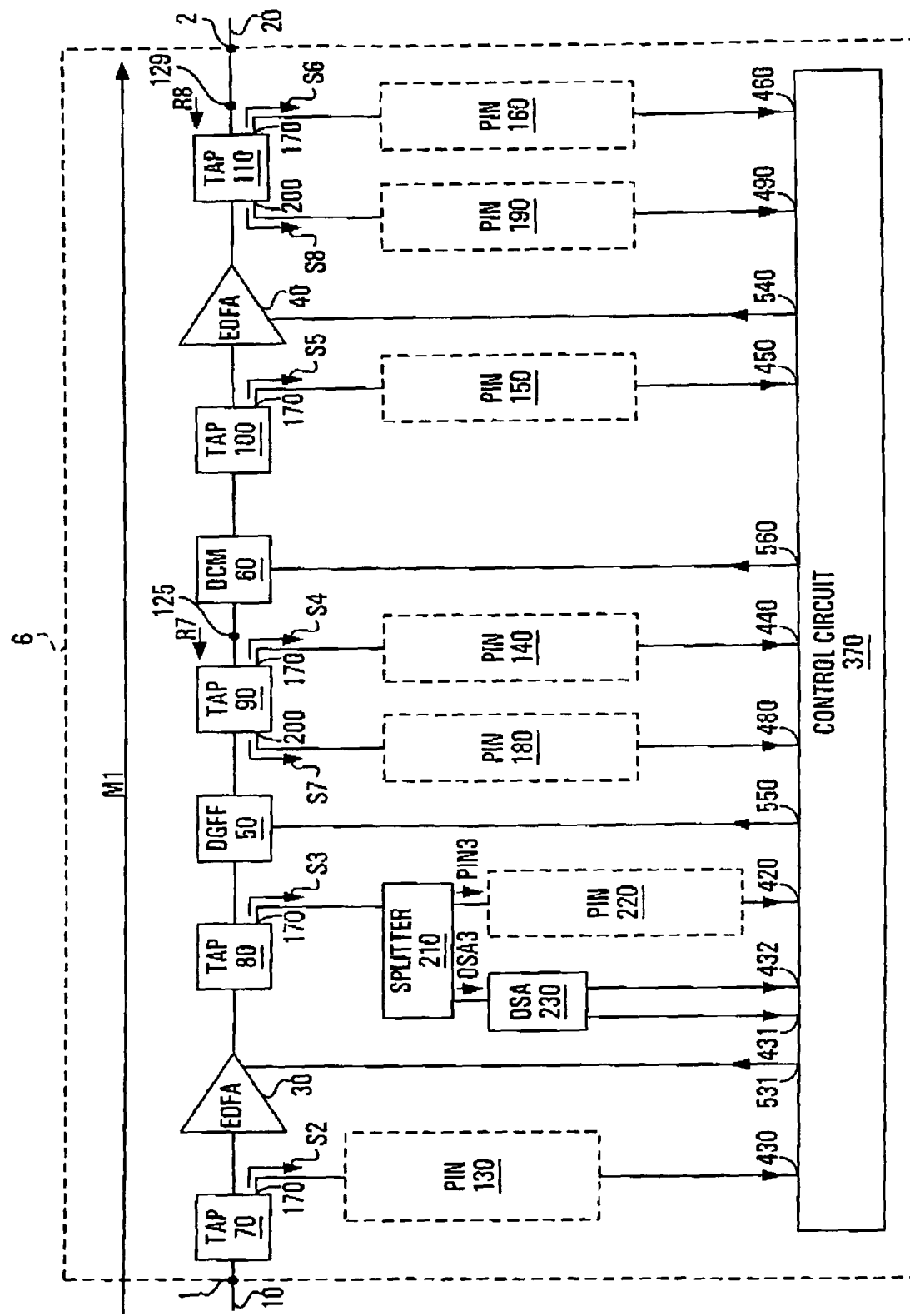
FIG. 2A is a schematic diagram of the optical line-amplifier of FIG. 1 implementing a controlled response to changing conditions, in another embodiment of the invention.

In the preferred embodiment of FIG. 1, the optical line-amplifier 5 monitors the channel power of the multiplexed optical signal M1. The control circuit 370 may also be used to provide a controlled response to fluctuations in the channel power and/or channel count of the multiplexed optical signal M1 at input 1 and/or within the optical line-amplifier 5. Referring to FIG. 2A, shown is a schematic diagram of the optical line-amplifier 5 of FIG. 1 implementing a controlled response to changing conditions, in another embodiment of the invention. An optical line-amplifier 6 similar to the optical line-amplifier 5 is shown except that the optical line-amplifier 6 comprises connections between the control circuit 370 and the input EDFA 30, the output EDFA 40, the DGFF 50 and the DCM 60 through outputs 531,540,550,560, respectively. By monitoring the channel power, $P_j$, of the multiplexed optical signal M1 at different co-location points of the optical line-amplifier 6 and fluctuations therein, the control circuit 370 provides instructions to the input and output EDFAs 30,40, respectively, on the required gain and provides instructions to the DGFF 50 and DCM 60, for gain equalization and dispersion compensation, respectively. The instructions are provided such that output channel power of the multiplexed optical signal M1 at output 2 is independent of fluctuations in channel power of the multiplexed optical signal M1 at input 1 and/or within the optical line-amplifier 6.

Figure 2B:
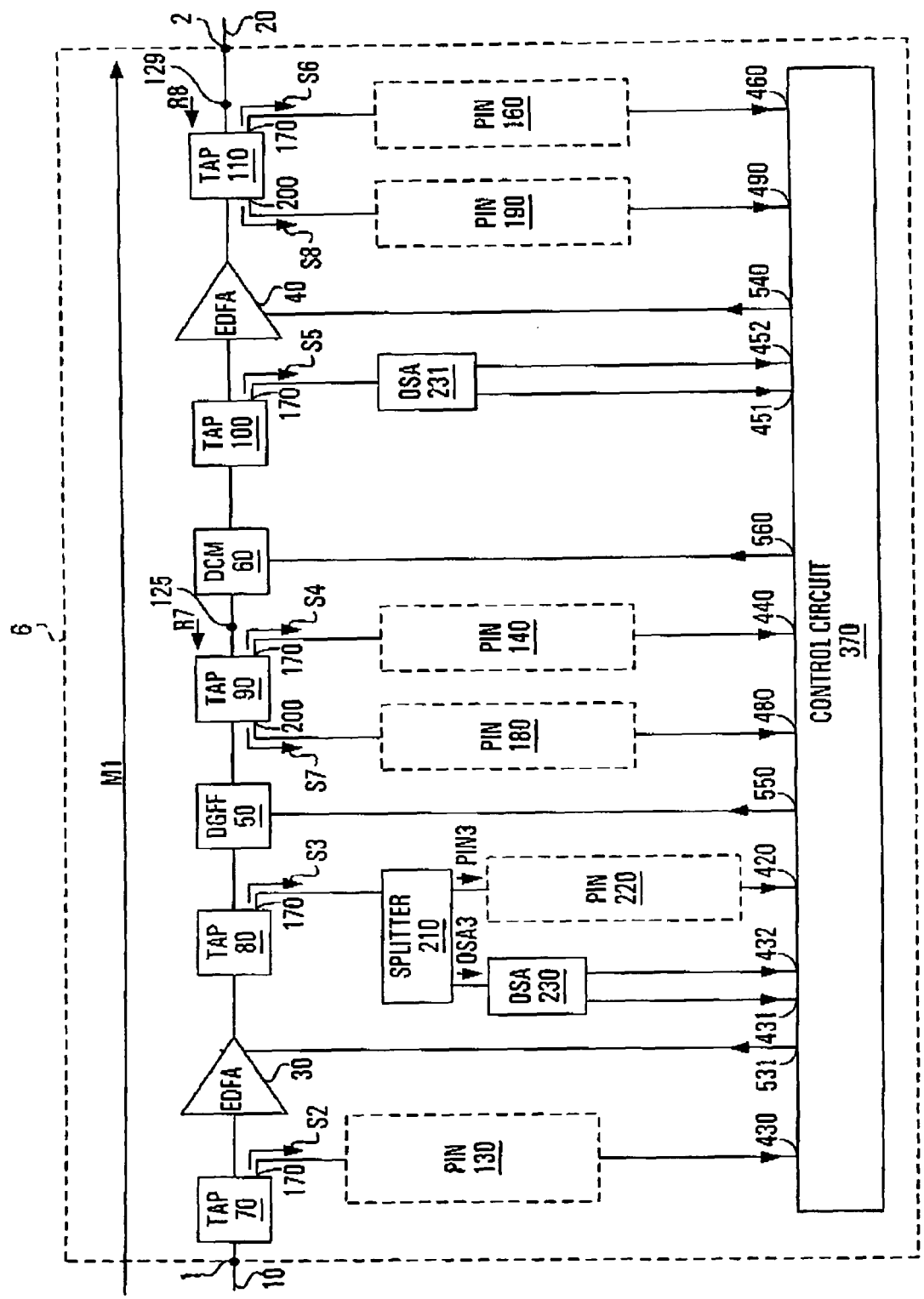
FIG. 2B is a schematic diagram of an optical line-amplifier implementing a controlled response to changing conditions, in another embodiment of the invention.

In the preferred embodiment of FIG. 2A, the in-line optical amplifier 6 is equipped with only one OSA 230 thereby providing only one designated co-location point. In some embodiments, the DCM 60 contributes significant amounts of SRS. This is due, for example, to long lengths of dispersion compensating fiber making up the DCM 60. In such embodiments, in some cases, it is necessary to perform an additional re-calibration. As shown in FIG. 2B, in such embodiments, an additional OSA 231 is inserted at optical tap 100 thereby providing a second designated co-location point at optical tap 100. Measurements of SRS at the second designated co-location point are used to measure channel power at the second designated co-location point and at the co-locations point corresponding to optical taps 100 and 110, respectively. Furthermore, measurements of SRS, at optical tap 100, received through an input 451 are used by the control circuit 370 to provide instructions, at output 531, to the EDFA 30 for controlling amplification and thereby control input power to the DCM 60.

In some embodiments of the invention, a number of in-line optical amplifiers similar to the in-line optical amplifier 6 are connected in a series connection. In such embodiments, anyone of the in-line optical amplifiers monitors the power transfer coefficients, $\beta_{ij}$, of an optical signal. The in-line optical amplifier that is monitoring the power transfer coefficients, $\beta_{ij}$, provides instructions to another one of the in-line optical amplifiers from which the optical signal is transmitted to control effects of SRS.

Figure 3:
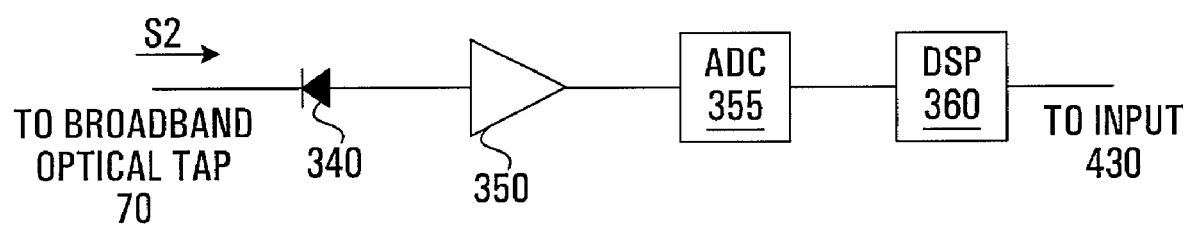
FIG. 3 is a schematic diagram of a PIN detector of FIG. 1.

Referring to FIG. 3, shown is a schematic diagram of the PIN detector 130 of FIG. 1. The PIN detector 130 is shown as an illustrative example of the PIN detectors 130,140,150,160, 180,190,220. The PIN detector 130 comprises a photodiode detector 340, an electrical amplifier 350, an analog-to-digital converter (ADC) 355 and a digital signal processor (DSP) 360 connected in series. In other embodiments of the invention, the photodiode detector 340 is any suitable photo-detector capable of converting an optical signal into an electrical signal. The DSP 360 carries out calculations as described herein below and is preferably implemented as software running on a microprocessor. Alternatively, the software may be impressed as hardware into the microprocessor. In other embodiments, any suitable electrical spectrum analyzer may be used. The multiplexed optical signal S2 propagates from the broadband optical tap 70 to the photodiode detector 340 where it is converted into an electrical signal that carries information of the multiplexed optical signal S2. The electrical signal is amplified through the electrical amplifier 350 and then propagates to the ADC 355 where it is converted to a digital signal. The digital signal then propagates to the DSP 360 where numerical Fourier transforms are applied to the digital signal. Outputs from the numerical Fourier transforms correspond to peak-to-peak voltages, $V_{PINi}$, associated with the power, $AM_i$, of AM tones of the electrical signal. The DSP 360 is calibrated to compensate for temperature dependence, wavelength dependence responsiveness, gain in the electrical amplifier 350 and effects of tapping only a portion of the multiplexed optical signal M1. More specifically, a responsivity, $R_{PINi}$ (where $R_{PINi}$ is in units of Watts/Volt), of the PIN detector 130 is measured in a calibration step during manufacture. The calibration is done with a light source having a known modulation applied to it and a known wavelength and optical power. A unit conversion from voltage to power is performed wherein the power, $AM_i$, of AM tones is obtained using $AM_i = R_{PINi} V_{PINi}$. In the preferred embodiment of FIG. 3, the DSP 360 performs the unit conversion and sends information on the power, $AM_i$, of AM tones to the control circuit 370 in units of power. In other embodiments of the invention, the responsivities, $R_{PINi}$, are stored in the control circuit 370 and it is the control circuit 370 that performs the unit conversion after receiving information from the DSP 360. In either case, the PIN detector 130 measures an indicator of the power, $AM_i$, of AM tones.

The PIN detectors 140,150,160,180,190,220 are similar except that a DSP within PIN detector 220 is also calibrated for losses due to splitting of the multiplexed optical signal S3 at the optical splitter 210.

In a preferred embodiment of the invention, PIN detectors are used to measure an indicator of the power, $AM_i$, of AM tones at various co-location points. In other embodiments of the invention, any AM detector suitable for detection of the power, $AM_i$, of AM tones may be used.

Figure 4A:
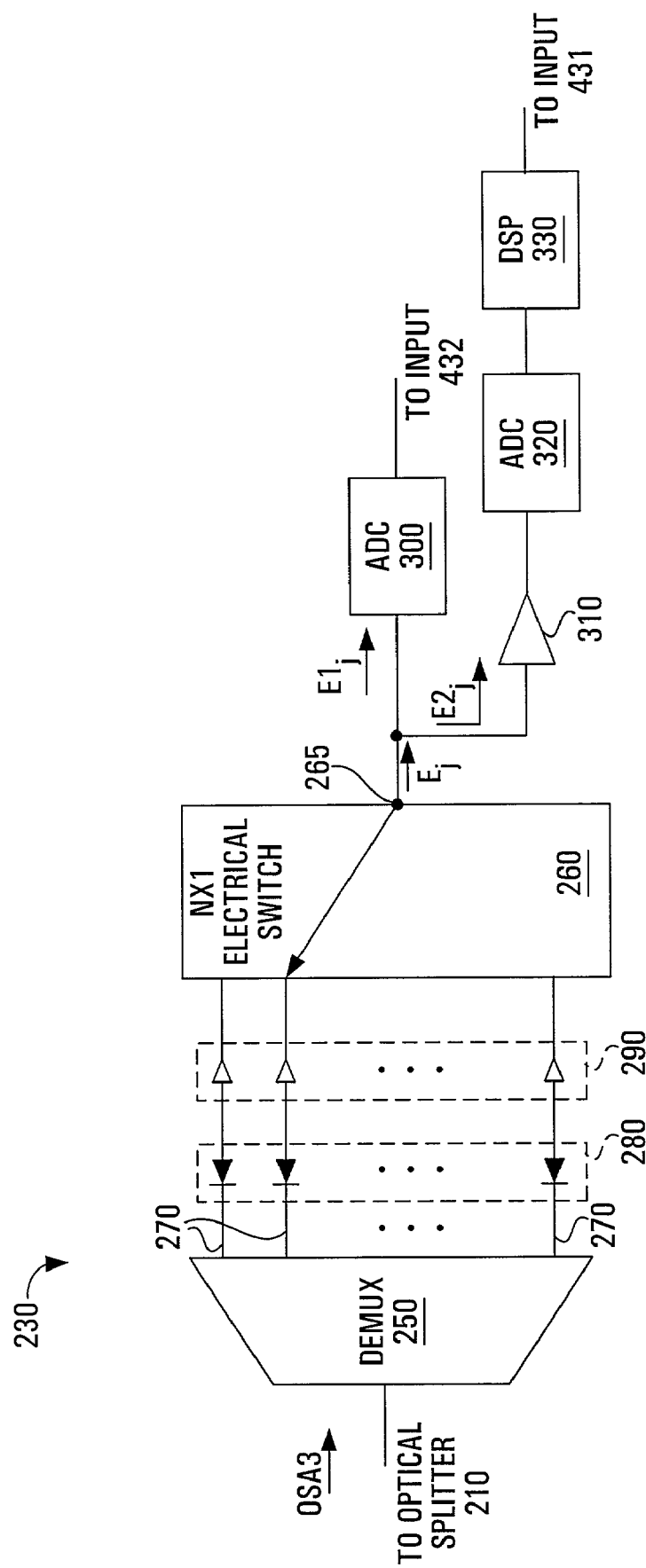
FIG. 4A is a schematic diagram of an optical spectrum analyzer (OSA) of the optical line-amplifier of FIG. 1.
Figure 4B:
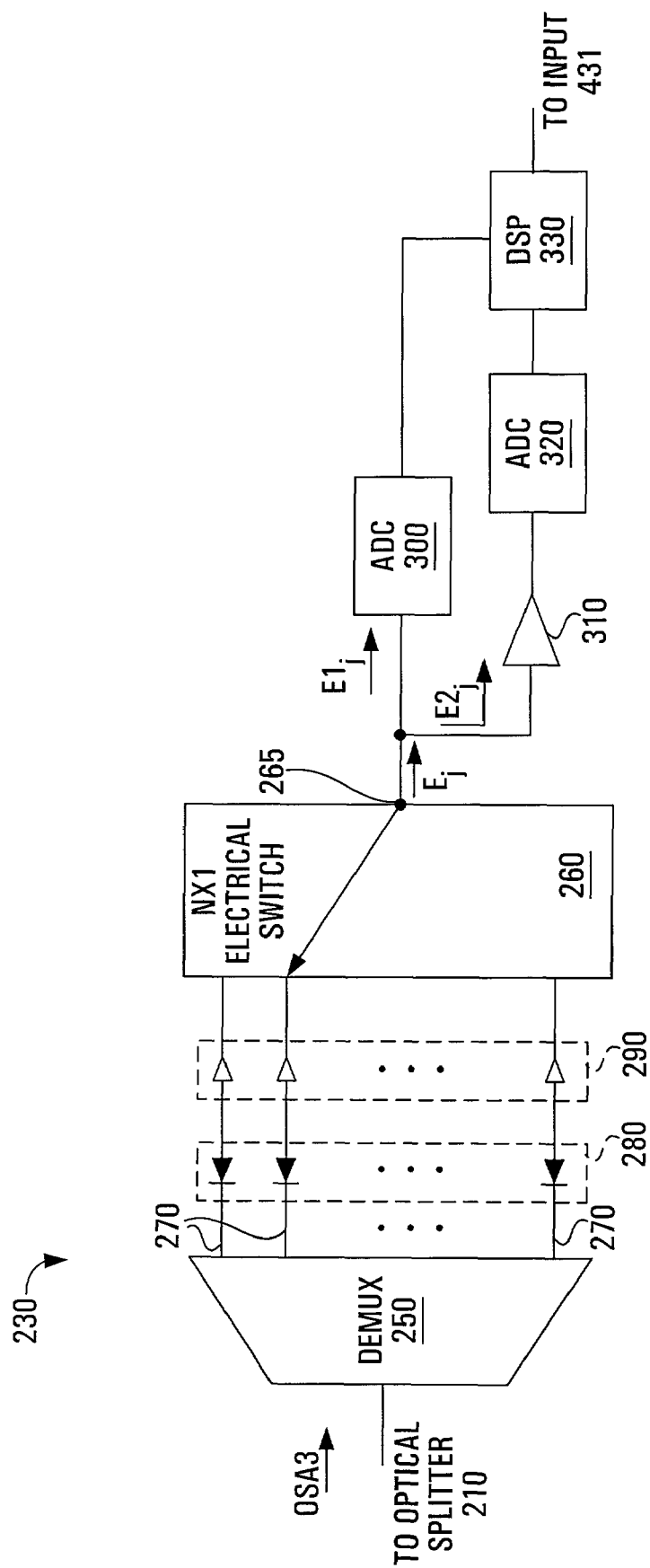
FIG. 4B is a schematic diagram of an optical spectrum analyzer (OSA) of the optical line-amplifier of FIG. 1, in another embodiment of the invention.

Referring to FIG. 4A, there is shown a schematic diagram of the OSA 230 of the in-line amplifier 5 of FIG. 1. The OSA 230 comprises a demultiplexer (DeMUX) 250 and an electrical switch 260 connected through a plurality of parallel paths 270 (only three shown). Preferably, the electrical switch 260 is a N×1 electrical switch. Within each one of the parallel paths 270 is one of a plurality of photodiode detectors 280 and one of a plurality of electrical amplifiers 290. In other embodiments of the invention, the photodiode detectors 280 are any suitable photo-detectors capable of converting an optical signal into an electrical signal. The electrical switch 260 is connected to an ADC 300 and to an electrical amplifier 310 through an output 265. The electrical amplifier 310 is connected to an ADC 320 and the ADC 320 is connected to a DSP 330. The DSP 330 carries out calculations that are preferably implemented as software running on a microprocessor. Alternatively, the software may be impressed as hardware into the microprocessor. In other embodiments of the invention, the DSP 330 is any suitable electrical spectrum analyzer.

The multiplexed optical signal OSA3 propagates to the DeMUX 250 where it is demultiplexed. Each channel of the optical signal OSA3 propagates through a respective one of the parallel paths 270 where it is converted into an electrical signal at a respective one of the photodiode detectors 280. Each electrical signal associated with respective ones of the channels of the multiplexed optical signal OSA3 is then amplified through a respective one of the electrical amplifiers 290. The electrical signals then propagate to the electrical switch 260 where they are switched sequentially in time through output 265. Consequently, at a particular time an electrical signal $E_j$ (j=1, 2, . . . , N) is output at output 265, a portion $E1_j$ of the electrical signal $E_j$ propagates to the ADC 300 where it is converted into a digital signal which is sent to the input 432 of the control circuit 370. The digital signal received from the ADC 300 provides a voltage, $V_j$, to the control circuit 370 at input 432, associated with the channel power, $P_j$, of each channel of the multiplexed optical signal M1 at the broadband optical tap 80. The control circuit 370 calculates the channel power, $P_j$, using $P_j=R_jV_j$ where $R_j$ is a responsivity in Watts/Volt through a path j of the parallel paths 270 of the OSA 230. The responsivity, $R_j$, is measured during a calibration step during manufacturing and stored in the control circuit 370. The calibration step is performed using a light source with a known wavelength and optical power. The responsivity, $R_j$, need not be stored in the control circuit 370. In a preferred embodiment of FIG. 4B, the responsivity, $R_j$, is stored in the DSP 330 and the ADC 300 is connected to the DSP 330. In such an embodiment, the voltage, $V_j$, is converted to the channel power, $P_j$, by the DSP 330 and information associated with the channel power, $P_j$, is sent to the control circuit 370 through input 431.

In FIG. 4A, at output 265, another portion $E2_j$ of the electrical signal $E_j$ propagates to the electrical amplifier 310 where it is amplified. The portion $E2_j$ of the electrical signal $E_j$ then propagates to the ADC 320 where it is converted into a digital signal which is then analyzed by the DSP 330 using numerical Fourier transforms. At one point in time, the output of the numerical Fourier transforms are peak-to-peak voltage swings, $V_{ppij}$ (i=1, ..., N) each corresponding to a specific modulation frequency. A peak-to-peak voltage swing, $V_{ppij}$, is associated with the fractional power, $\beta_{ij}P_j$, of AM tone i of the unique AM tones present upon channel j of the multiplexed optical signal M1. Information on the peak-to-peak voltage swings, $V_{ppij}$, is sent to the control circuit 370 at input 431. The control circuit 370 converts the peak-to-peak voltage swing, $V_{ppij}$, into the fractional power, $\beta_{ij}P_j$, using $\beta_{ij}P_j=R_iV_{ppij}$ where $R_i$ is a wavelength dependent responsivity in units of Watts/Volt. The wavelength dependent responsivity, $R_i$, is measured in a calibration step, during manufacture, using a light source having a known modulation applied to it and a known wavelength and power, and stored in the control circuit 370. In other embodiments of the invention the wavelength dependent responsivity, $R_i$, is stored in the DSP 330 and it is the DSP 330 that converts the peak-to-peak voltage swing, $V_{ppij}$ into the fractional power, $\beta_{ij}P_j$.

Figure 5:
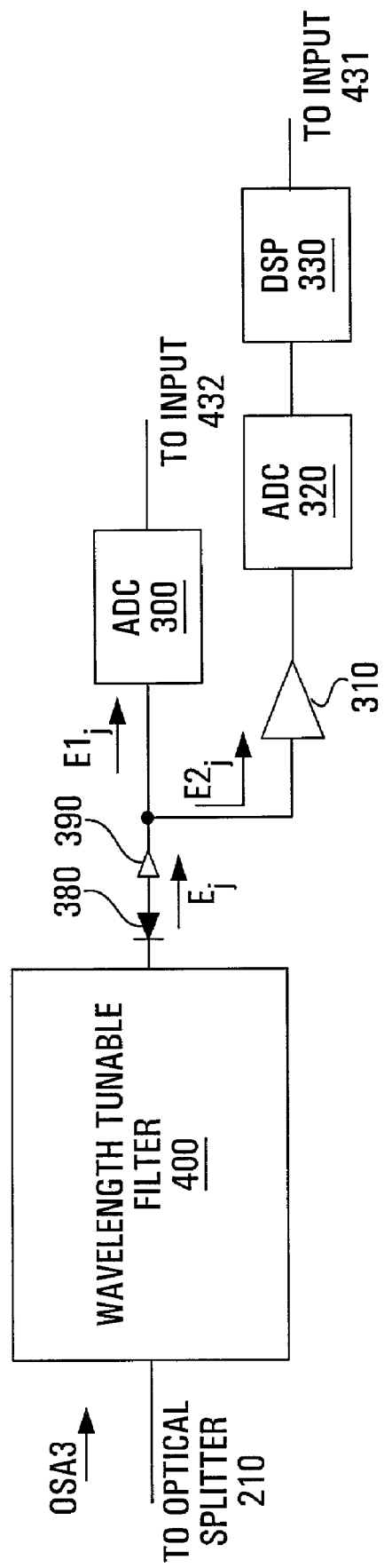
FIG. 5 is a schematic diagram of the OSA of the optical line-amplifier of FIG. 1, in another embodiment of the invention.

Referring to FIG. 5, there is shown a schematic diagram of the OSA 230 of the in-line amplifier 5 of FIG. 1, in another embodiment of the invention. The OSA of FIG. 5 is similar to the OSA of FIG. 4 except that the DeMUX 250, the electrical switch 260, the photodiode detectors 280 and the electrical amplifiers 290 have been replaced by a serial connection of a wavelength tunable filter 400, a photodiode detector 380 and an electrical amplifier 390. In other embodiments of the invention, the photodiode detector 380 is any suitable photodetector capable of converting an optical signal into an electrical signal. The electrical amplifier 390 is connected to the ADC 300 and to the electrical amplifier 310.

Channels of the optical signal OSA3 are effectively demultiplexed through the wavelength tunable filter 400 by sweeping, at increments of time, across a range of wavelengths associated with the channels of the multiplexed optical signal OSA3. The channels of the optical signal OSA3 are therefore output the wavelength tunable filter 400 sequentially in time and each optical signal associated with the channels of the multiplexed optical signal OSA3 is converted to a respective electrical signal through the photodiode detector 380. The respective electrical signal is then amplified by the electrical amplifier 390.

Figure 6:
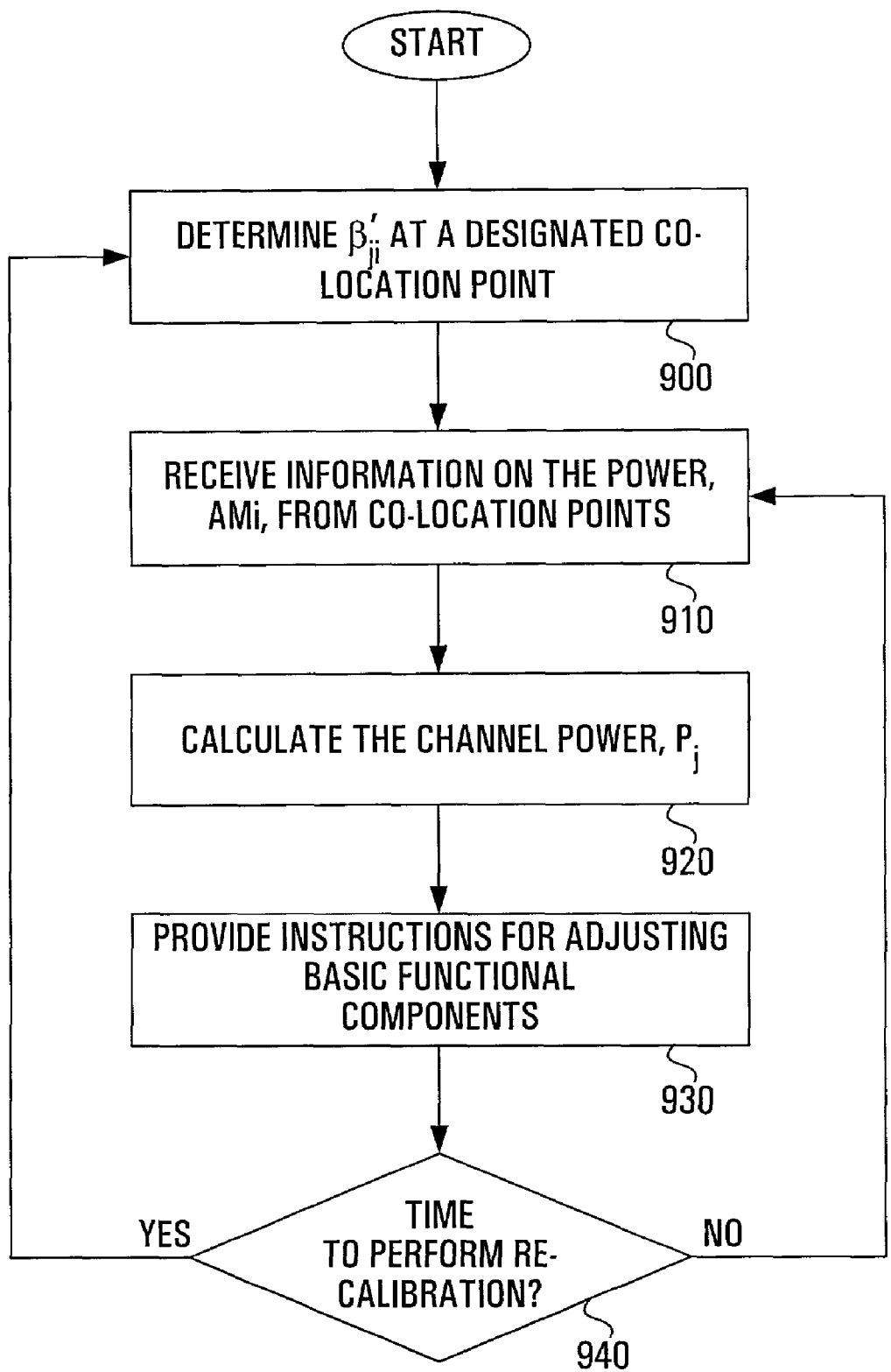
FIG. 6 is a flow chart of a program used by a control circuit of FIG. 2A to implement the method of WDM channel tagging and monitoring.

Referring to FIG. 6, shown is a flow chart of a program used by the control circuit 370 of FIG. 2A to implement the method of WDM channel tagging and monitoring. The program is used to calculate the channel power, $P_j$, of each channel of a multiplexed optical signal having impressed upon each channel a unique AM tone. At step 900 the inverse power transfer coefficients, $\beta'_{ji}$, are determined at one of a plurality of co-location points. A method of determining the inverse power transfer coefficients, $\beta'_{ji}$, which is used by the program, is described herein below with reference to FIG. 7. At step 910, information associated with the power, $AM_i$, of the unique AM tones, is received from each one of the co-location points (PIN detectors 130,140,150,160, 180,190,220). More specifically, the program provides instructions for receiving such information when channel power is required at a co-location point for control and/or monitoring function. At step 920, the channel power, $P_j$, is calculated for each one of the co-location points using the measured power, $AM_i$, of AM tones at a respective one of the co-location points and the inverse power transfer coefficients, $\beta'_{ji}$. Step 930 is optional and provides a method of controlling output characteristics of the multiplexed optical signal. Although step 930 is implemented in the control circuit 370 of FIG. 2A, it is not implemented in that of FIG. 1. At step 930, the input and output EDFAs 30,40, respectively, the DGFF 50 and the DCM 60 (the basic functional components), through which the multiplexed optical signal propagates, are adjusted in response to fluctuations in the channel power and/or channel count of the multiplexed optical signal M1 at input 1 and/or the co-location points.

The inverse power transfer coefficients, $\beta'_{ji}$, may change with time in which case new values need to be determined. Consequently, at periodic intervals, at step 940, new values for the inverse power transfer coefficients, $\beta'_{ji}$, to be used in subsequent calculations of the channel power, $P_j$, are determined by stepping up to step 900; otherwise the same values for the inverse power transfer coefficients, $\beta'_{ji}$, are used in the next calculation of the channel power, $\beta'_j$, by stepping to step 910 and determining new values for the power, $AM_i$, of AM tones.

Figure 7:
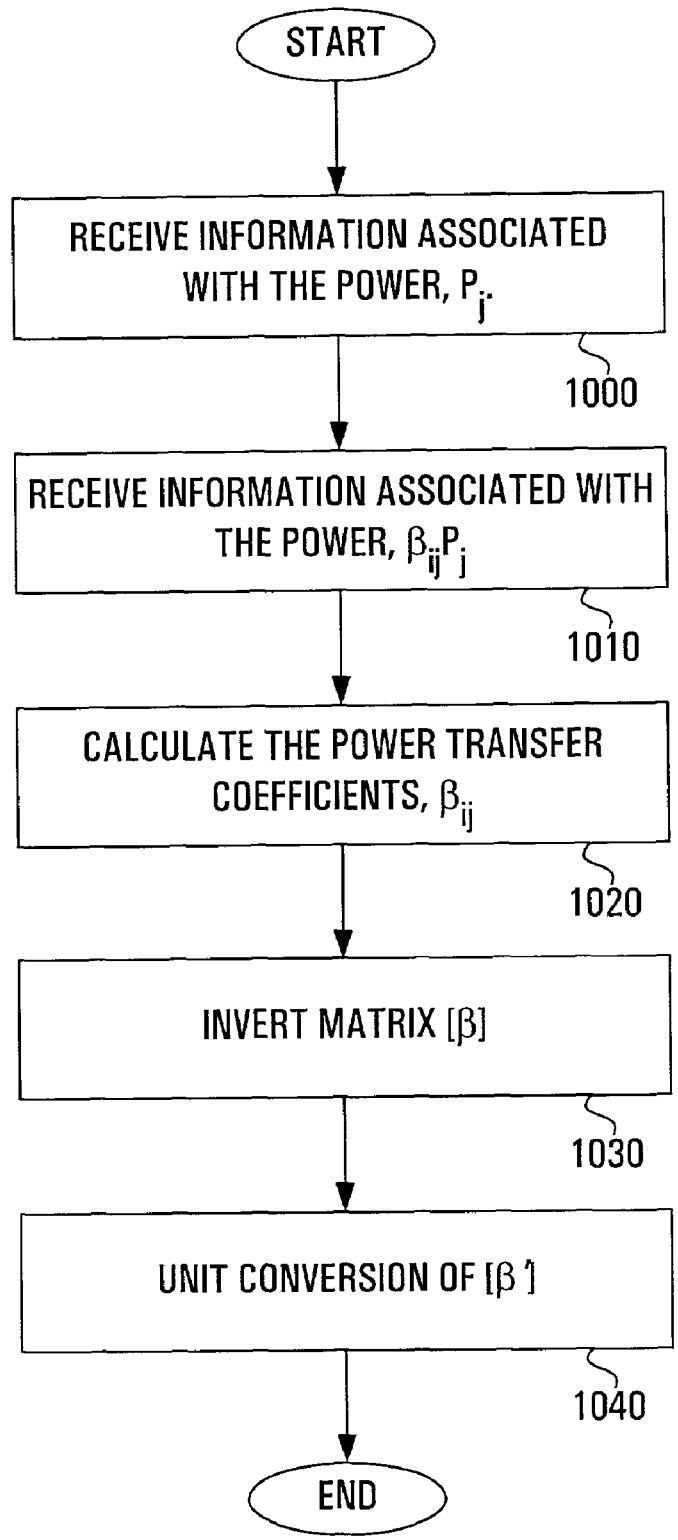
FIG. 7 is a flow chart of a method used by the program of FIG. 6 to determine inverse power transfer coefficients, $\beta'_{ji}$.

Referring to FIG. 7, shown is a flow chart of a method used by the program of FIG. 6 to determine the inverse power transfer coefficients, $\beta'_{ji}$. At step 1000, received is the information associated with the channel power, $P_j$, of each channel of the multiplexed optical signal M1 at the designated co-location point. At step 1010, received is the information associated with the fractional power, $\beta_{ij}P_j$, of AM tone i of the unique AM tones present upon channel j of the multiplexed optical signal M1 at the designated co-location point. More particularly, the program provides instructions to an OSA for performing measurements to update the matrix [β]. Instructions are carried out at time intervals that are shorter than a time scale associated with changes in SRS contributions. In embodiments of the invention wherein more than one unique AM tone per channel have been impressed onto the channels of the multiplexed optical signal to provide WID information. Any of these AM tones may be used in the calculation of the power transfer coefficients, $\beta_{ij}$, and the WID information is extracted from a sequence defined by the AM tones. The power transfer coefficients, $\beta_{ij}$, are then calculated, at step 1020, from the fractional power, $\beta_{ij}P_j$, and the channel power, $P_j$, using equation (3). The matrix [β] is then inverted at step 1030 resulting in inverse matrix [β'] of which the inverse power transfer coefficients, $\beta'_{ji}$, are its matrix elements. Inversion of the matrix [β] is performed using any suitable matrix inversion algorithm such as LU decomposition. At step 1040, a unit conversion is applied to the inverse power transfer coefficients, $\beta'_{ji}$, such that the channel power, $P_j$, can be properly calculated, in units of power, using equation (2).

As discussed herein above, SRS causes AM tones to be transferred to other wavelengths. More particularly, AM tones that are transferred to longer wavelengths are transferred in-phase. Alternatively, AM tones that are transferred to shorter wavelengths are transferred 180° out of phase. Consequently, the power transfer coefficients, $\beta_{ij}$, can be positive or negative. More particularly, with $\beta_{ij} \leq 0$ when $i>j$ and $\beta_{ij} \geq 0$ when $i \leq j$. This is true in cases where there is no chromatic dispersion an in such cases the channel power, $P_j$, may be obtained from absolute values of the power transfer coefficients, $\beta_{ij}$. In other cases where there is dispersion such a method only works when the dispersion is low. To properly deal with cases in which there is dispersion the power transfer coefficients, $\beta_{ij}$, of the matrix $[\beta]$ are treated as complex values, each having a phase, due to SRS, which may have any value between 0° and 360°. Since the OSA 230 makes power measurements sequentially in time, the power transfer coefficients, $\beta_{ij}$, also have a phase due to differences in time at which measurements by the OSA 230 are done. The electrical switch 260 allows measurement of power a single channel at a time. For example, a channel j of the multiplexed optical signal M1 has channel power, $P_j$, and at one point in time the OSA measures the channel power, $P_j$. There at a point in time the vector [P] as only one non-zero component, $P_j$, and from equation (1), the power, $AM_i$, of AM tone i is then given by $$\begin{bmatrix} AM_1 \\ AM_2 \\ M \\ AM_N \end{bmatrix} = \begin{bmatrix} \beta_{1,1} & \beta_{1,2} & \Lambda & \beta_{1,N} \\ \beta_{2,1} & \beta_{2,2} & & M \\ M & & O & \\ \beta_{N,1} & \Lambda & & \beta_{N,N} \end{bmatrix} \begin{bmatrix} 0 \\ M \\ P_j \\ 0 \end{bmatrix} \quad (4)$$

which gives $$\begin{bmatrix} AM_1 \\ AM_2 \\ M \\ AM_N \end{bmatrix} = \begin{bmatrix} \beta_{1,j} P_j \\ \beta_{2,j} P_j \\ M \\ \beta_{N,j} P_j \end{bmatrix} \quad (5)$$

Consequently, the phase due the time at which measurements are done is the same for each power transfer coefficient, $\beta_{ij}$, with a column of the matrix $[\beta]$. The matrix $[\beta]$ is therefore written as $$[\beta] = \begin{bmatrix} e^{-i\varphi_1}\beta_{1,1} & e^{-i\varphi_2}\beta_{1,2} & \Lambda & e^{-i\varphi_N}\beta_{1,N} \\ e^{-i\varphi_1}\beta_{2,1} & e^{-i\varphi_2}\beta_{2,2} & & M \\ M & & O & \\ e^{-i\varphi_1}\beta_{N,1} & \Lambda & & e^{-i\varphi_N}\beta_{N,N} \end{bmatrix} \quad (6)$$

$$= \begin{bmatrix} z_1\beta_{1,1} & z_2\beta_{1,2} & \Lambda & z_N\beta_{1,N} \\ z_1\beta_{2,1} & z_2\beta_{2,2} & & M \\ M & & O & \\ z_1\beta_{N,1} & \Lambda & & z_N\beta_{N,N} \end{bmatrix}$$

where $z_i = e^{-i\varphi_j}$ and $\varphi_j$ corresponds to a phase at a time at which the channel power, $P_j$, is measured by the OSA 230. The phase $\varphi_j$ is obtained from complex values of the numerical Fourier transforms performed by the DSP 330 of the OSA 230.

Using equation (6), equation (1) is re-written as $$\begin{bmatrix} AM_1 \\ AM_2 \\ M \\ AM_N \end{bmatrix} = \begin{bmatrix} z_1\beta_{1,1} & z_2\beta_{1,2} & \Lambda & z_N\beta_{1,N} \\ z_1\beta_{2,1} & z_2\beta_{2,2} & & M \\ M & & O & \\ z_1\beta_{N,1} & \Lambda & & z_N\beta_{N,N} \end{bmatrix} \begin{bmatrix} P_1 \\ P_2 \\ M \\ P_N \end{bmatrix} \quad (7)$$

To obtain the channel powers, $P_j$, equation (7) is inverted to give $$\begin{bmatrix} P_1 \\ P_2 \\ M \\ P_N \end{bmatrix} = \begin{bmatrix} z_1\beta_{1,1} & z_2\beta_{1,2} & \Lambda & z_N\beta_{1,N} \\ z_1\beta_{2,1} & z_2\beta_{2,2} & & M \\ M & & O & \\ z_1\beta_{N,1} & \Lambda & & z_N\beta_{N,N} \end{bmatrix}^{-1} \begin{bmatrix} AM_1 \\ AM_2 \\ M \\ AM_N \end{bmatrix} \quad (8)$$

$$= \begin{bmatrix} \beta'_{1,1}/z_1 & \beta'_{1,2}/z_1 & \Lambda & \beta'_{1,N}/z_1 \\ \beta'_{2,1}/z_2 & \beta'_{2,2}/z_2 & & M \\ M & & O & \\ \beta'_{N,1}/z_N & \Lambda & & \beta'_{N,N}/z_N \end{bmatrix} \begin{bmatrix} AM_1 \\ AM_2 \\ M \\ AM_N \end{bmatrix}$$

From equation (8), the channel power, $P_j$, is given by $$P_j = \sum_{i=1}^{N} \frac{\beta'_{ji}}{z_j} AM_i = \frac{\sum_{i=1}^{N} \beta'_{ji} AM_i}{z_j} = \frac{P'_j}{z_j} \quad (9)$$

and a real part of the channel power, $P_j$, is given by $$P_j\big|_{real} = abs\left(\frac{P'_j}{z_j}\right) = abs(P'_j) = \sqrt{(P'_j P'^*_j)} \quad (10)$$

where $P'^*_j$ is a complex conjugate of $P'_j$ and $abs(z_j)=1$.

Equation (10) shows that in embodiments where the channel power, $P_j$, is calculated using complex values of the power transfer coefficients, $\beta_{ij}$, results are independent of the phase, $\varphi_j$. As such, calculating the channel power, $P_j$, in this way provides a suitable method of obtaining the channel power, $P_j$. Furthermore, this method has the benefit that it is also suitable in cases where there is dispersion.

Numerous modifications and variations of the present invention are possible in light of the above teachings. It is therefore to be understood that within the scope of the appended claims, the invention may be practiced otherwise than as specifically described herein.

We claim:

1. A method of monitoring cross-talk, at a point in an optical system, arising at least in part from a non-linear process in a transmission medium utilized in the optical system in a multiplexed optical signal having a plurality of channels upon one or more of which has been impressed, at another point in the optical system, a unique dither, the method comprising:
   determining channel power of at least one channel of the plurality of channels;
   determining a fractional power of any dither present upon the at least one channel resulting at least in part from the non-linear process in the transmission medium; and
   determining a power transfer coefficient from the fractional power and the channel power of the at least one channel, the power transfer coefficient indicative of cross-talk occurring on the at least one channel from any of the plurality of channels upon which the unique dither has been impressed, the cross-talk due at least in part to the non-linear process in the transmission medium.

2. A method according to claim 1 wherein the power transfer coefficient is determined from an equation $\beta_{ij}=(\beta_{ij}P_j)/P_j$ wherein $\beta_{ij}$ is the power transfer coefficient, $P_j$ is the power of a channel, j, corresponding to the at least one channel and $\beta_{ij}P_j$ is the fractional power of a dither, I, corresponding to the dither present upon the at least one channel.

3. A method of controlling output characteristics of the multiplexed optical signal comprising the method of claim 1 and further comprising providing instructions for controlling the power transfer coefficient.

4. A method according to claim 1 wherein a non-linear process in a transmission medium comprises stimulated Raman scattering.

5. A method according to claim 1 wherein at least one of the plurality of channels of the multiplexed optical signal is impressed with a plurality of dithers to provide wave identification (WID) information.

6. An optical apparatus adapted to monitor cross-talk, at a point in an optical system, arising at least in part from a non-linear process in a transmission medium utilized in the optical system, in a multiplexed optical signal having a plurality of channels upon one or more of which has been impressed, at another point in the optical system, a unique dither, the apparatus comprising:

an OSA (Optical Spectrum Analyzer) adapted to measure an indicator of channel power of at least one channel of the plurality of channels and to measure an indicator of a fractional power of any dither present upon the at least one channel resulting at least in part from the nonlinear process in the transmission medium; and a control circuit adapted to determine a power transfer coefficient from the fractional power and the channel power of the at least one channel, the power transfer coefficient indicative of cross-talk occurring on the at least one channel from any of the plurality of channels upon which the unique dither has been impressed, the cross-talk due at least in part to the non-linear process in the transmission medium.

7. An apparatus according to claim 6 wherein a non-linear process in a transmission medium comprises stimulated Raman scattering.

8. An apparatus according to claim 6 wherein the indicator of the fractional power, $\beta_{ij}P_j$, and the indicator of the channel power, $P_j$, are voltages and one of the OSA and the control circuit is adapted convert the voltages into powers.

9. An apparatus according claim 6 applied to a multiplexed optical signal wherein at least one channel of the plurality of channels having impressed a unique dither comprises at least one additional unique dither to provide WID.

10. An apparatus according to claim 6 comprising a plurality of basic functional components which are optical devices, wherein the plurality of basic functional components include one or more of a group consisting of at least one optical tap, at least one PIN detector, at least one erbium-doped fiber amplifier (EDFA), at least one dynamic gain flattened filter (DGFF), and at least one dispersion compensation module (DCM).

* * * * *